US007458074B2

(12) United States Patent
Dull, III et al.

(10) Patent No.: US 7,458,074 B2
(45) Date of Patent: Nov. 25, 2008

(54) METHOD AND APPARATUS FOR INSTALLING AND UPGRADING AN APPLICATION IN A COMPUTER SYSTEM

(75) Inventors: Samuel Daniel Dull, III, Rochester, MN (US); James E. Favre, Rochester, MN (US); Shawn Michael Hanson, Eyota, MN (US)

(73) Assignee: International Business Machiens Corporation, Armonk, NY (US)

( * ) Notice: Subject to any disclaimer, the term of this patent is extended or adjusted under 35 U.S.C. 154(b) by 1071 days.

(21) Appl. No.: 09/821,920

(22) Filed: Mar. 30, 2001

(65) Prior Publication Data

US 2002/0144249 A1 Oct. 3, 2002

(51) Int. Cl.
*G06F 9/44* (2006.01)

(52) U.S. Cl. .................. 717/169; 717/115; 717/170; 717/173

(58) Field of Classification Search .................. 717/116, 717/168–178, 115; 707/100–204
See application file for complete search history.

(56) References Cited

U.S. PATENT DOCUMENTS

| 4,916,637 | A | * | 4/1990 | Allen et al. ............... 706/11 |
| 5,367,686 | A |   | 11/1994 | Fisher et al. ............. 395/700 |
| 6,006,035 | A | * | 12/1999 | Nabahi .................... 717/175 |
| 6,051,032 | A |   | 4/2000 | Harrison et al. .......... 717/11 |
| 6,161,218 | A | * | 12/2000 | Taylor ..................... 717/174 |
| 6,167,567 | A | * | 12/2000 | Chiles et al. ............. 717/173 |
| 6,182,275 | B1 | * | 1/2001 | Beelitz et al. ............. 717/175 |
| 6,199,204 | B1 |   | 3/2001 | Donohue .................. 717/11 |
| 6,378,027 | B1 | * | 4/2002 | Bealkowski et al. ...... 710/302 |
| 6,397,385 | B1 | * | 5/2002 | Kravitz .................... 717/173 |
| 6,418,554 | B1 | * | 7/2002 | Delo et al. ............... 717/174 |
| 6,493,871 | B1 | * | 12/2002 | Welch et al. ............. 717/173 |

OTHER PUBLICATIONS

C. K. Leung et al., Developing a company wide estimating, design and installation system using object oriented programming, 1994, IEE Colloquium on 'The Design, Implementation and Use of Object Oriented Systems', Digest No. 1994/003, pp. 8/1-12.*
W. Lebvre, Packages program installation technique, Jan. 1999, UNIX Reviews Performance computing, vol. 17, No. 1, pp. 53-55.*
Benchiao Jai, Radius: rapid application delivery, installation and upgrade system, Nov. 1998, Proceedings Technology of object-oriented languages, pp. 18-186.*
U.S. Appl. No. 09/714,729; "Data Processing System and Method for Creating and Distributing a Customized Installation Package for Each of a Plurality of Client Computer Systems", filed Nov. 16, 2000.
U.S. Appl. No. 09/450,558; "System and Method for Managing Documents Having Formula Based Document Links", filed Nov. 30, 1999.
U.S. Appl. No. 09/633,037; "Method and Apparatus for a Web Application Processing System", filed Sep. 30, 1999.

* cited by examiner

*Primary Examiner*—Tuan Q. Dam
*Assistant Examiner*—Thuy Dao
(74) *Attorney, Agent, or Firm*—Grant A. Johnson; Roy W. Truelson

(57) ABSTRACT

A method of distributing and executing upgrade/installation instructions as data objects. These instructions can then be completed automatically requesting user interaction only when required. This method would allow someone with little knowledge of the application and/or internal implementation of said application to perform an upgrade to the application.

17 Claims, 4 Drawing Sheets

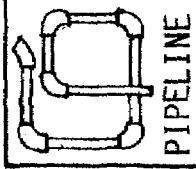

Installation Step for Pipeline

PIPELINE

Required fields are marked with an asterisk(*) and must be filled in to complete the form Release Pipeline Release 6.1 Step 1 Installation Information —210

220↗

| Title: | Refresh database designs —233 |
|---|---|
| Step: | 1 —224 |
| Pre-Requisite Steps: | —226 |
| Concurrent Steps: | —228 |
| Release: | Pipeline Release 6.1 —229 |

Step 1 Installation Instructions

230↗

{ Refresh the designs on all of the Pipeline databases. —235

Step Code

```
Use "InstallLibrary"

Sub Initialize
On error goto errorhandler
'********* Insert your code here ***************     ~242 end 2

'If code does not complete successfully, use " End-1"
'If the step must be completed manually, use " End 2"
Exit Sub
Errorhandler:
    msgbox "ERROR: " + Str(Err) + " " + Error$, 64, "Installation Error"
    End -1
End Sub
```

240

200

Pipeline Release 6.0 (Form Revised June 29, 2001)

FIG. 2B

METHOD AND APPARATUS FOR INSTALLING AND UPGRADING AN APPLICATION IN A COMPUTER SYSTEM

FIELD OF THE INVENTION

The present invention generally relates to methods of installing, configuring, and upgrading programs within a computer system, and application programs for facilitating these methods. More particularly, the present invention relates to a simpler method of installing, upgrading, and configuring databases using an instruction processing program.

BACKGROUND OF THE INVENTION

The development of the Electronic Discrete Variable Automatic Computer (EDVAC) computer system of 1948 is often cited as the beginning of the computer era. Since that time, computer systems have evolved into extremely complicated devices. To be sure, today's computers are more sophisticated than early systems such as the EDVAC. Fundamentally speaking, though, the most basic requirements levied upon computer systems have not changed. Now, as in the past, a computer system's job is to access, manipulate, and store information. This fact is true regardless of the type or vintage of computer system.

Many large organizations own thousands of individual computers, which are located throughout the organization's facilities. Each individual computer manipulates information by following a detailed set of instructions, commonly called a "program" or "software." These programs frequently require changes ("updates," "upgrades," or "fixes") to correct errors ("bugs") in the program and to add new functionality. That is, users frequently want to change the particular set of instructions to be performed by the computer to add new features and to fix bugs.

One problem with conventional upgrading techniques is that each upgrade must be performed on each copy of the program. Thus, if a business has 2000 copies of a particular piece of software, each upgrade procedure must be performed 2000 times. This can require a substantial investment of time. This problem is compounded because, as software systems have increased in complexity, the level of experience and the time required to perform each upgrade has also increased. Today, even relatively simple changes to the programs can require large amounts of time by highly skilled employees.

Organizations also need to add ("install") new software programs onto their existing computers from time to time. Like conventional upgrade methods, conventional software installation methods often required that a highly technically sophisticated employee physically go to each computer and add the new software. Again, for a large organization, this consumes substantial resources.

One partial solution to these problems required the developer of a particular piece of software to create an external application that upgrades the primary software. This new "installation program" is then distributed to each end user and executed. However, these programs are difficult to create, and as a result, divert scarce development resources away from the primary software program. Installation programs are also relatively large, which can significantly increase the computer resources necessary to perform the upgrade.

Accordingly, a need exists for a simpler method for installing and upgrading software on a computer system.

SUMMARY OF THE INVENTION

The present invention uses simple data objects that allow the computer system to upgrade itself, requesting user input only when needed. These data objects can be created quickly and are easily modified to suit each individual installation. They can also provide the ability to remotely track the progress of an installation by maintaining start and completion times as properties of themselves. In addition, each upgrade object can include prerequisite information, which allows the upgrade to be performed by independent processes if the prerequisites have been completed.

One aspect of the present invention is a method of upgrading a computer program on a computer system, the computer system including an instruction processing program. One embodiment of this method comprises receiving an upgrade object associated with the computer program, the upgrade object including an instruction set adapted for use by the instruction processing program, and executing the instruction set with the instruction processing program. Another embodiment of this method comprises creating an upgrade object associated with the computer program, the upgrade object including an instruction set adapted for use by the instruction processing program; transmitting the upgrade object to the computer system; and instructing an end user to execute the instruction set with the instruction processing program.

Another aspect of the present invention is a method of installing a computer program on a computer system, the computer system including an instruction processing program. One embodiment of this method comprises receiving an installation object associated with the computer program, the installation object including an instruction set adapted for use by the instruction processing program, and executing the instruction set with the instruction processing program. Another embodiment of this method comprises creating an installation object associated with the computer program, the installation object including an instruction set adapted for use by the instruction processing program; transmitting the installation object to the computer system; and instructing an end user to execute the instruction set with the instruction processing program.

Still another aspect of the present invention is a computer program product, one embodiment of which comprises an upgrade object configured to upgrade a software program on a computer system having an instruction processing program, the upgrade object including an instruction set capable of causing the instruction processing program to perform one or more upgrade tasks, and a signal bearing media bearing the upgrade object.

One feature and advantage of the present invention is that it allows end users to install and upgrade software with minimal intervention and with little required expertise. The present invention also allows software developers to create and distribute upgrades quicker and easier. These and other features, aspects, and advantages will become better understood with reference to the following description, appended claims, and accompanying drawings.

BRIEF DESCRIPTION OF THE DRAWINGS

FIGS. 2A and 2B are a diagram showing one upgrade object embodiment.

DETAILED DESCRIPTION

Figure 1:
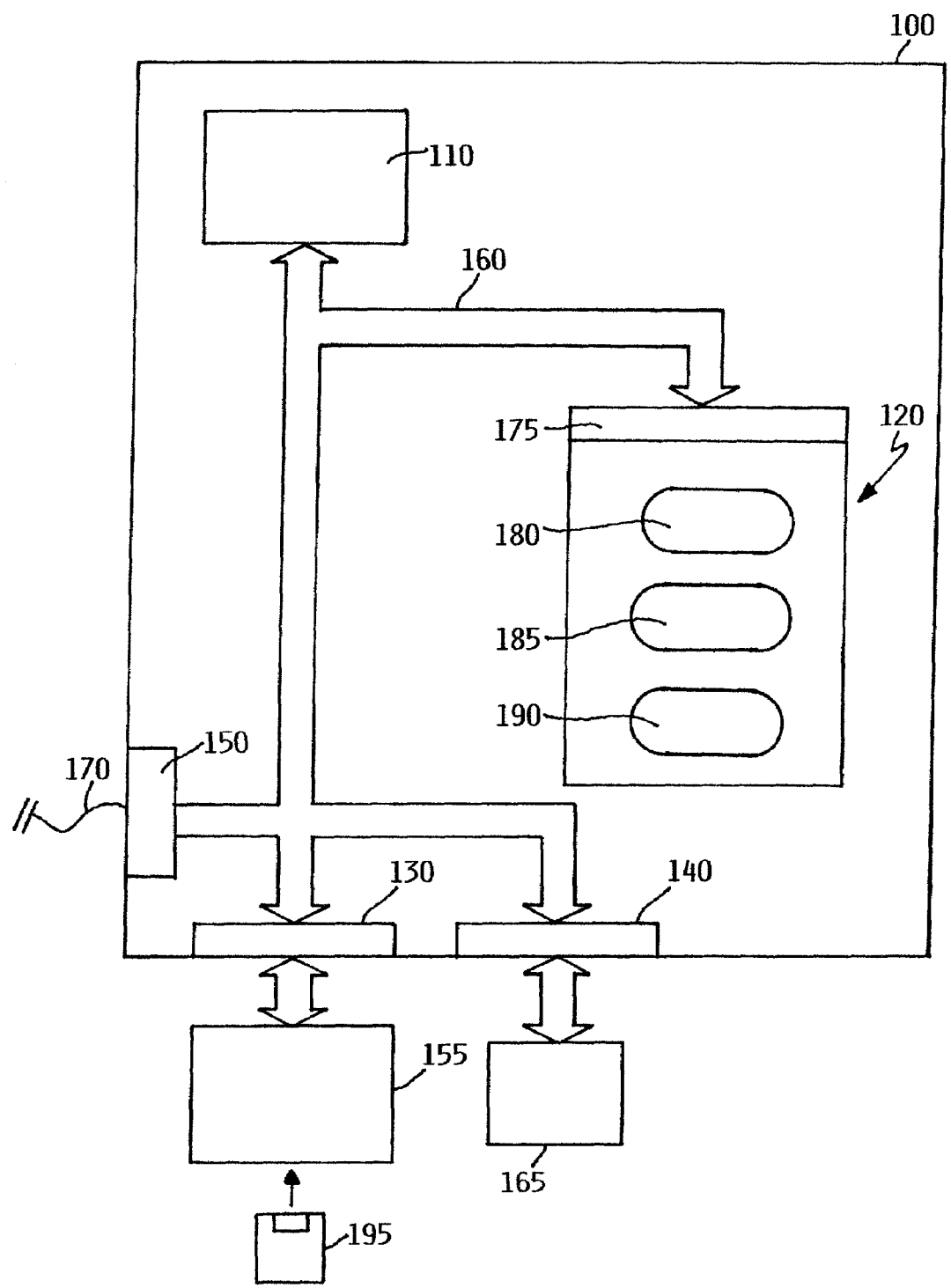
FIG. 1 is a schematic diagram of a computer system.

FIG. 1 depicts a computer 100 embodiment having a processor 110 connected to a main memory 120, a mass storage interface 130, an I/O interface 140, and a network interface 145 via a system bus 160. The mass storage interface 130 connects one or more mass storage devices 155, such as a hard disk drive, to the system bus 160. The input/output ("I/O") interface 140 connects one or more input/output devices 165, such as a keyboard, to the system bus 160. The network interface 150 connects the computer 100 to other computers 100 (not shown) over an appropriate communication medium 170, such as the Internet. The memory 120 contains an operating system 175, a program to be upgraded 180, a communication program 185, and a script processing program 190.

FIGS. 2A and 2B shows one embodiment of an upgrade object 200. This upgrade object 200 comprises a release field 210, a control information field 220, a description field 230, and step code field 240. The control information field 220 comprises a title field 233, a step number field 224, a prerequisites field 226, a concurrent step field 228, and a release field 229. The description field 230 includes a human readable explanation 235 of what the actions that upgrade object 200 will perform. The step code field 240 comprises a plurality of instructions 242 ("script") in text format, which are capable of being converted into a machine-useable form ("compiled") and executed by the script processing program 190 (FIG. 1).

In operation, the present invention provides a method of installing, upgrading, and maintaining software in which the end user has a very small role in the total picture. In the embodiment shown in FIGS. 1, 2A, and 2B, a system administrator will first install (or instruct the end users to install) the program to be upgrated 180, the communications program 185, the script processing program 190 onto each individual computer 100. These programs may be installed using conventional methods, such as using a special purpose installation program stored on a suitable storage medium.

When the system administrator determines that it is necessary to upgrade the program 180, the system administrator will prepare a group of upgrade objects 200 and will send the objects 200 to the end user. Each upgrade object 200 contains a logically related group of tasks, some of which may require user interaction and some of which may be entirely automatic. A typical upgrade will use between three and ten upgrade objects 200.

In response to receiving the upgrade objects 200, the end user will instruct the script processing program 190 residing on his computer to begin compiling and executing the instructions contained in the first upgrade object's step code field 240. The script processing program 190 will then check to make sure any necessary prerequisites have been met and will begin to execute the instructions contained in the step code field 240, prompting the end user as needed. After completing the instructions in the first object 200, the script processing program 190 will record that the particular upgrade object 200 was successfully completed and will report this information back to the system administrator. The script processing program 190 will then repeat these actions on the next upgrade object 200, until all of the upgrade objects 200 associated with the upgrade have been completed.

The communications program 185 can be any device capable of receiving the upgrade objects from the system administrator and providing the script instructions 242 to the script processing program 190. Suitable programs include, but are not limited to, electronic mail programs and file transfer protocol programs. Electronic mail programs may be particularly desirable because the system administrator may initiate the upgrade process shown in FIG. 3 by simply mailing the upgrade objects 200 to the end user.

The script processing program 190 may be any apparatus capable of reading the script instructions 242 and causing the computer 100 to perform the corresponding tasks. In many embodiments, the scripting program will compile the script instructions 242 into the preferred form for the particular computer 100 that receives the object. One suitable script processing program 190 is the Lotus® Notes® program produced by Lotus Development Corporation of Cambridge, Mass. This program is desirable because it provides electronic mail functions, allows end users to compile and execute scripts sent via electronic mail, and is already fully developed. Thus, the system administrator does not need to develop and install special purpose scripting and communication software to practice the invention.

In this embodiment, the release field 210 will contain a release value. Each object 200 in the upgrade package will share a common release value. This release value can be an explicit property, like a text field with specific value, or it can be implied by some other mechanism, such as being distributed with a group of instructions. The step number field in this embodiment contains a sequence number. Like the release value, the sequence number can be an explicit field like a number field, or can be implied by some other method. The prerequisites in the prerequisites field 226 list what previous upgrades must have been performed and/or what hardware or software is required to perform the upgrade. Those skilled in the art will recognize that these prerequisites may frequently implied from and/or duplicative of the sequence number 204. However, some embodiments may use the prerequisites to allow some steps to be run out of order. These embodiments may be particularly desirable if one of the steps in the upgrade requires the computer 100 to access a particular outside resource.

Some upgrade object 200 embodiments may also include a start time field and an end time field, (not shown). These fields may be desirable for use in managing the instruction set. Some object embodiments may also contain an instruction type field (not shown). This field may be desirable to distinguish between instructions that require user action and instructions that may be performed entirely automatically. Those skilled in the art will recognize that this information by also be implied by the contents of the script.

Figure 3:
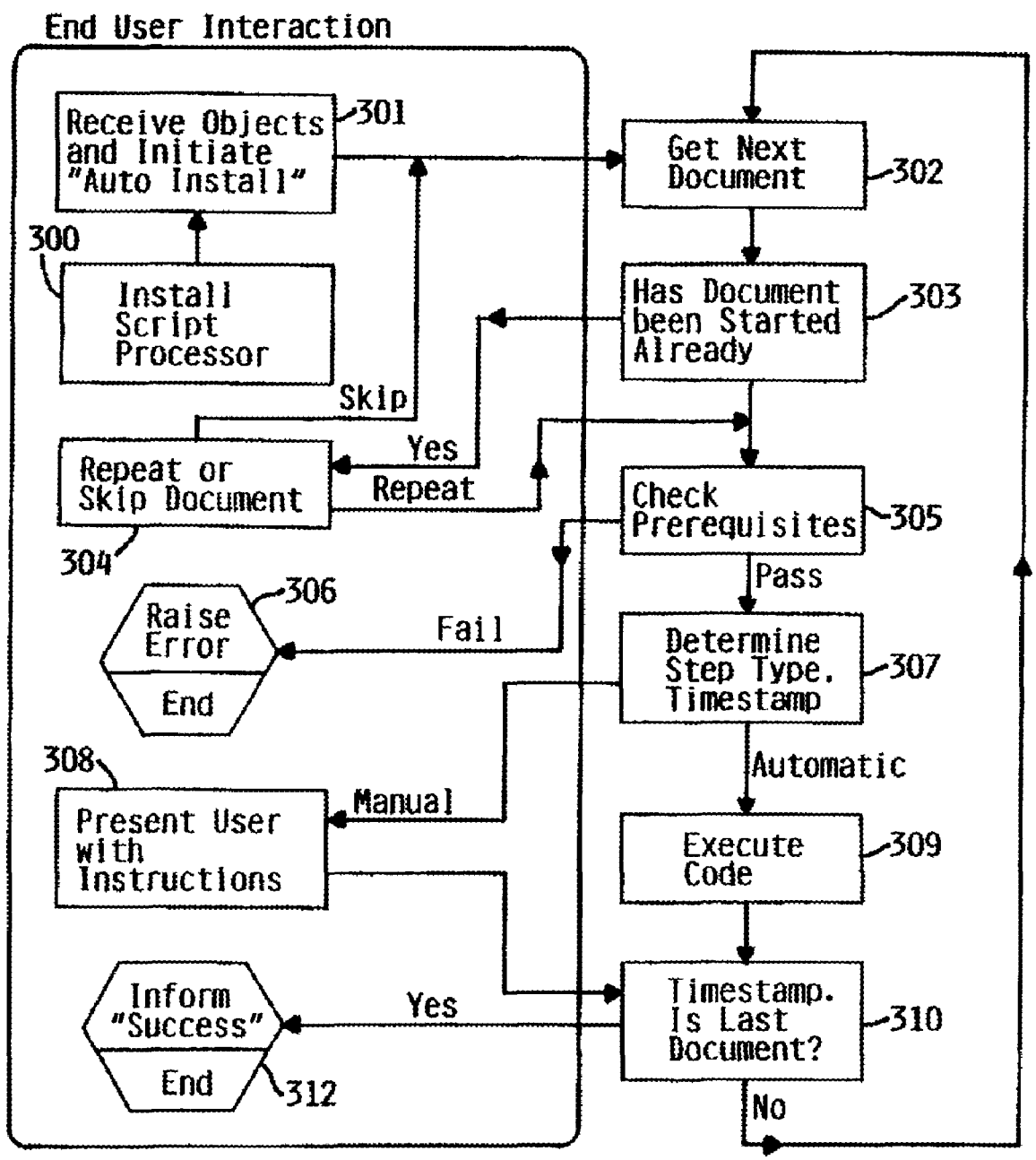
FIG. 3 is a flowchart depicting one embodiment of the present invention adapted for use in upgrading a database in the Lotus® Notes® program.

FIG. 3 is a flowchart depicting one embodiment of the present invention adapted for use in upgrading a Lotus® Notes® program database called "Pipeline." At block 300, the system administrator and/or the end user will install the communication program 185 and script processing program 190 on the end user's computer 100. When the system administrator determines that the end user's computer needs upgrading or additional software, the system administrator sends a group of installation objects to the end user at block 301. Also at block 301, the end user will initiate the "AutoInstall" function. This function is contained within the existing script processing program, and will cause it to begin compiling and executing the script.

In the specific embodiment shown in FIG. 3, the AutoInstall function is an action either in a Lotus® Notes® program view or document.

At block 302, the AutoInstall function will locate the first data object in the instruction set, which in this specific embodiment is a simple Lotus® Notes® document. Before continuing with the Lotus® Notes® object, it is determined at block 303 whether the object has already been started elsewhere. If the object has been started, the end user chooses (at block 304) whether to skip this object and continue to the next object (i.e., return to block 302), or to repeat this block. If the instruction has not previously been started or the user has decided to repeat it, the object is then checked at block 305 to be sure the prerequisites have been met. If the prerequisites have not been met, the installation fails and the system administrator is notified at block 306. If the prerequisites have been met, the object is time-stamped and the type of instruction is determined at block 307. If it is a manual instruction, the text of the instruction is presented to the end user at block 308. If it is an automatic instruction, the text of the instruction is interpreted and executed at block 309. In this embodiment, the LotusScript® EXECUTE statement is used to accomplish this block. Once the instruction has been completed, the instruction is time-stamped at block 310, then checked to see if it is the last instruction. If it is the last instruction, the user is notified at block 312 of a successful installation and the function terminates. If it is not the last block, the process is continued on the next instruction object at block 302.

Referring again to FIG. 1, the processor 110 in the computer 100 may be constructed from one or more microprocessors and/or integrated circuits. Processor 110 executes program instructions stored in main memory 120. Main memory 120 stores programs and data that the processor 110 may access. When computer 100 starts up, the processor 110 initially executes the program instructions that make up the operating system 124. The operating system 175 is a sophisticated program that manages the resources of the computer 100. Some of these resources are the processor 110, the main memory 120, the mass storage interface 130, the input/output interface 140, the network interface 150, and the system bus 160.

The I/O interface 140 directly connects the system bus 160 to one or more I/O devices 165, such as a keyboard, mouse, or cathode ray tube. Note, however, that while the I/O interface 140 is provided to support communication with one or more I/O devices 165, some computer 100 embodiments do not require an I/O device 165 because all needed interaction with other computers 100 occurs via network interface 150.

Although the computer 100 is shown to contain only a single processor 110 and a single system bus 160, those skilled in the art will appreciate that the computer 100 may have multiple processors 110 and/or multiple buses 160. In addition, the interfaces may also each include a separate, fully programmed microprocessor. These embodiments may be desirable because the interface processors can off-load compute-intensive processing from processor 110. However, those skilled in the art will appreciate that the present invention applies equally to computers 100 that simply use I/O adapters to perform similar functions.

The network interface 150 is used in this embodiment to connect other computers and/or devices to the computer 100 across a network 170. The present invention applies equally no matter how the computer 100 may be connected to other computers and/or devices, regardless of whether the network connection 170 is made using present-day analog and/or digital techniques or via some networking mechanism of the future. In addition, many different network protocols can be used to implement the communication between the computers and/or devices. One suitable network protocol is the Transmission Control Protocol/Internet Protocol ("TCP/IP").

The mass storage interface 130 in this embodiment directly connects the system bus 160 to one or more mass storage devices 155. The mass storage devices 155, in turn, may be any apparatus capable of storing information on and/or retrieving information from a mass storage medium 195. Suitable mass storage devices 155 and mediums 155 include, without limitation, hard disk drives, CD-ROM disks and drives, DVD disks and drives, tapes and tape drives. Additionally, although the mass storage device 155 is shown directly connected to the system bus 160, embodiments in which the mass storage device 155 is located remote from the computer 100 are also within the scope of the present invention.

Although the present invention has been described in detail with reference to certain examples thereof, it may be also embodied in other specific forms without departing from the essential spirit or attributes thereof. For example, the present invention may be used to install new programs onto the computer 100 and/or to delete unnecessary programs from the computer 100. It may also be used to initiate periodic maintenance tasks, such as defragmenting the hard disk drive, scanning the computer 100 for computer viruses, backing up data, and the like. The present invention, and components thereof, are also capable of being distributed as a program product in a variety of forms, and applies equally regardless of the particular type of signal bearing media used to actually carry out the distribution. Examples of suitable signal bearing media include, without limitation: recordable type media, such as floppy disks and CD-RW disks, CD-ROM, DVD, and transmission type media, such as digital and analog communications links. In addition, some embodiments may replace or supplement the text script 242 in FIG. 2B with binary code. These embodiments may be desirable because they may require fewer resources from the end user's computer.

The present invention offers numerous advantages over conventional installation and upgrade methods. For example, the end user will only need to perform actions for one or two steps in the typical process. This allows relatively inexperienced end users to perform the upgrade and/or installation, rather than more experienced system administrators. Embodiments of the present invention also provide for automatic reporting and user interaction if an error occurs during the upgrade process. These embodiments may be desirable because they provide the system administrator with a detailed list of which upgrades have been installed on each computer and, in the case of an error, at what step in the upgrade process the error occurred. This information can help the system administrator diagnose what caused the error. In addition, embodiments of the present invention allow the system administrator to use functionality already present on the end user's computer 100, which decreases the effort required to prepare the upgrade objects and reduces the size of the resulting objects. That is, because the upgrade objects 200 in these embodiments use functionality present in the script processing program 190, the upgrade object 200 can be smaller and simpler than the installation programs used in the prior art. This feature also allows the system administrator to create generic upgrade objects 200 and to rely upon the script processing program 190 to customize the resulting upgrade for the end user's computer 100.

The accompanying figures and this description depicted and described embodiments of the present invention, and features and components thereof. It is desired that the embodiments described herein be considered in all respects as illustrative, not restrictive, and that reference be made to the appended claims for determining the scope of the invention.

We claim:

1. A method of upgrading a computer program installed on a first computer system, the computer program including a script processing module, the method comprising:

receiving a plurality of upgrade objects associated with the computer program, each said upgrade object including a respective script comprising a plurality of script instructions of a pre-defined script instruction set adapted for use by the script processing module to upgrade the computer program, the script being not independently executable without the script processing module, each said upgrade object being generated on a second computer system remote from said first computer system and transmitted from said second computer system to said first computer system, wherein each said upgrade object contains a respective sequence number, wherein at least one said upgrade object contains at least one respective prerequisite, and wherein not all said upgrade objects have the same at least one respective prerequisite;

with respect to each said upgrade object containing at least one respective prerequisite, automatically determining whether the at least one respective prerequisite has been met; and performing an upgrade of said computer program by compiling and executing each said script on said first computer system with the script processing module, wherein, with respect to each said upgrade object containing at least one respective prerequisite, the respective script contained in the object is not compiled and executed until the respective at least one prerequisite contained in the object has been met, and wherein the at least one prerequisite allows at least one script to be executed out of sequence;

wherein at least one said upgrade object includes at least one script instruction of said pre-defined script instruction set which, when compiled and executed with said script processing module, instructs a user to manually perform an operation for performing said upgrade.

2. The method of claim 1, further comprising instructing the script processing module to execute the script.

3. The method of claim 1, further comprising automatically reporting from said first computer system to said second computer system that the script has been executed.

4. The method of claim 1, wherein the plurality of upgrade objects are transmitted from said second computer system to said first computer system by electronic mail.

5. The method of claim 1, further comprising the step of configuring the first computer system to perform the steps of receiving a plurality of upgrade objects, automatically determining whether the at least one respective prerequisite has been met, and performing an upgrade of said computer program by compiling and executing each said script.

6. A method of upgrading a computer program installed on a first computer system, the computer program including a script processor, the method comprising:

creating a plurality of upgrade objects associated with the computer program on a second computer system remote from said first computer system, each said upgrade object including a respective script comprising a plurality of script instructions of a pre-defined script instruction set adapted for use by the script processor to upgrade the computer program, the script being not independently executable without the script processor, wherein each said upgrade object contains a respective sequence number, wherein at least one said upgrade object contains at least one respective prerequisite, and wherein not all said upgrade objects have the same at least one respective prerequisite, each prerequisite to be determined as being met by said script processor before compiling and executing the script contained in the corresponding upgrade object;

transmitting the plurality of upgrade objects from the second computer system to the first computer system; and instructing an end user to perform an upgrade of said computer program by compiling and executing each said script with the script processor, wherein, with respect to each said upgrade object containing a least one respective prerequisite, the respective script contained in the object is not compiled and executed until the respective at least one prerequisite contained in the object has been met, and wherein the at least one prerequisite allows at least one script to be executed out of sequence;

wherein at least one said upgrade object includes at least one script instruction of said pre-defined script instruction set which, when compiled and executed with said script processor, instructs the end user to manually perform an operation for performing said upgrade.

7. The method of claim 6, wherein at least one said upgrade object presents the end user with instructions to perform a task.

8. The method of claim 7, wherein at least one said upgrade object prompts the end user to indicate that the task has been performed.

9. A method of maintaining a first computer system, comprising:

(i) installing a computer program on the first computer system, the computer program including a script processing module;

(ii) receiving a plurality of maintenance objects for performing one or more maintenance operations on said first computer system, each said maintenance object including a respective script comprising a plurality of script instructions of a pre-defined script instruction set adapted for use by the script processing module and a respective sequence number, at least one said maintenance object containing a prerequisite field containing one or more prerequisites for executing the script, wherein not all said maintenance objects have the same at least one respective prerequisite, each said maintenance object being generated on a second computer system remote from said first computer system and transmitted from said second computer system to said first computer system; and (iii) instructing the computer program to process each said maintenance object, whereby each said maintenance object causes the first computer system to:

if the maintenance objects contains one or more prerequisites, determine if the one or more prerequisites have been met; and instruct the script processing module to execute the script if all prerequisites, to the extent there are any, contained in the maintenance object have been met, wherein at least one said maintenance object includes at least one script instruction of said pre-defined script instruction set which, when executed with said script processing module, instructs the end user to manually perform an operation for maintaining said first computer system; and report that the script has been executed, wherein the at least one prerequisite allows at least one script to be executed out of sequence.

10. The method of claim 9, wherein said maintenance objects, when executed by said script processing module, perform at least one maintenance operation with respect to said first computer system chosen from: (a) defragmenting a hard disk drive of said first computer system, (b) scanning said first computer system for computer viruses, and (c) backup up data of said first computer system.

11. The method of claim 9, wherein said maintenance objects, when executed by said script processing module, perform at least one maintenance operation chosen from: (a) installing a new program on said first computer system, (b) deleting an existing program from said first computer system, and (c) upgrading an existing program on said first computer system.

12. A method of installing a computer program into an instruction processing environment on a first computer system, the instruction processing environment including a script processing module, the method comprising:

receiving a plurality of installation objects associated with the computer program, each said installation object including a respective script comprising a plurality of script instructions of a pre-defined script instruction set adapted for use by the script processing module to install the computer program into the instruction processing environment on said first computer system, the script being not independently executable without the script processing module, each said installation object being generated on a second computer system remote from said first computer system and transmitted from said second computer system to said first computer system, wherein each said installation object contains a respective sequence number, wherein at least one said installation object contains at least one respective prerequisite, and wherein not all said installation objects have the same at least one respective prerequisite;

with respect to each said installation object containing at least one respective prerequisite, automatically determining whether the at least one respective prerequisite has been met; and installing said computer program into said instruction processing environment by compiling and executing each said script with the script processing module, wherein, with respect to each said installation object containing at least one respective prerequisite, the respective script contained in the installation object is not compiled and executed until the respective at least one prerequisite contained in the installation object has been met, and wherein the at least one prerequisite allows at least one script to be executed out of sequence wherein at least one said installation object includes at least one script instruction of said pre-defined script instruction set which, when compiled and executed with said script processing module, instructs a user to manually perform an operation for performing said installation.

13. The method of claim 12, further comprising reporting that at least one said script has been executed.

14. The method of claim 12, wherein each said installation object is transmitted from said second computer system to said first computer system by electronic mail.

15. A method of installing a computer program into an instruction processing environment on a first computer system, the instruction processing environment including a script processing module, the method comprising:

creating a plurality of installation objects associated with the computer program on a second computer system remote from said first computer system, each said installation object including a respective script comprising a plurality of script instructions of a pre-defined script instruction set adapted for use by the script processing module to install the computer program into the instruction processing environment on said first computer system, the script being not independently executable without the script processing module, wherein each said installation object contains a respective sequence number, wherein at least one said installation object contains at least one respective prerequisite, and wherein not all said installation objects have the same at least one respective prerequisite, each prerequisite to be determined as being met by said script processing module before compiling and executing the script contained in the corresponding installation object;

transmitting the plurality of installation objects from the second computer system to the first computer system; and instructing an end user to install said computer program into said instruction processing environment by compiling and executing each said script with the script processing module, wherein, with respect to each said installation object containing a least one respective prerequisite, the respective script contained in the installation object is not compiled and executed until the respective at least one prerequisite contained in the installation object has been met, and wherein the at least one prerequisite allows at least one script to be executed out of sequence;

wherein at least one said installation object includes at least one script instruction of said pre-defined script instruction set which, when compiled and executed with said script processing module, instructs the end user to manually perform an operation for performing said installation.

16. The method of claim 15, wherein at least one said installation object presents the end user with instructions to perform a task.

17. The method of claim 16, wherein at least one said installation object prompts the end user to indicate that the task has been performed.

* * * * *